United States Patent
Takizawa et al.

(10) Patent No.: US 8,524,133 B2
(45) Date of Patent: Sep. 3, 2013

(54) METHOD FOR MANUFACTURING RESIN FILM FOR THIN FILM-CAPACITOR AND THE FILM THEREFOR

(75) Inventors: Kenro Takizawa, Saitama (JP); Yuzo Morioka, Saitama (JP); Kazuhiro Suzuki, Saitama (JP); Michimasa Ote, Saitama (JP)

(73) Assignee: Shin-Etsu Polymer Co., Ltd, Tokyo (JP)

( * ) Notice: Subject to any disclaimer, the term of this patent is extended or adjusted under 35 U.S.C. 154(b) by 0 days.

(21) Appl. No.: 12/917,145

(22) Filed: Nov. 1, 2010

(65) Prior Publication Data

US 2011/0117348 A1   May 19, 2011

(30) Foreign Application Priority Data

Nov. 13, 2009   (JP) .................................. 2009-259615

(51) Int. Cl.
*D01D 5/16*   (2006.01)

(52) U.S. Cl.
USPC ....... 264/210.2; 264/1.29; 264/433; 264/452; 264/464; 264/466; 264/45.8; 264/45.9; 264/46.2; 264/623; 264/634; 264/638; 264/171.21; 264/211.12

(58) Field of Classification Search
USPC ............. 264/210.1, 614, 615, 1.29, 433, 467, 264/323, 3.3, 452, 464, 37.26, 37.32, 45.9, 264/46.1, 46.2, 46.3, 638, 639, 466, 45.8, 264/623, 634, 171.21, 210.2, 211.2; 438/381, 438/384, 386, 393, 396
See application file for complete search history.

(56) References Cited

U.S. PATENT DOCUMENTS

| | | | |
|---|---|---|---|
| 2002/0128412 A1* | 9/2002 | Kitahara et al. | 526/250 |
| 2002/0167111 A1* | 11/2002 | Tsunekawa et al. | 264/210.7 |

FOREIGN PATENT DOCUMENTS

| | | |
|---|---|---|
| JP | 2007-300126 A | 11/2007 |
| JP | 2009-152590 A | 7/2009 |

OTHER PUBLICATIONS

Y. Kano: "Technical Trend of Film for Condenser" Convertec, No. 40, Jul. 2006, pp. 82-88 with a partial English Translation.

\* cited by examiner

*Primary Examiner* — Jeffrey Wollschlager
*Assistant Examiner* — Stella Yi
(74) *Attorney, Agent, or Firm* — Arent Fox LLP

(57) ABSTRACT

The present invention provides a method for manufacturing a film for a film capacitor making it possible to produce a film for a film capacitor which has a thickness of 10 μm or less and which is excellent in a heat resistance and a voltage resistance at a high thickness accuracy by using a polyetherimide resin and provides as well a film for a film capacitor. The above manufacturing method comprises the steps of:

feeding a molding material 1 containing a polyetherimide resin into an extruding machine 10,
    extruding a film 50 for a film capacitor immediately downward from a lip part 21 at a tip of a T dice 20 thereof,
    interposing the film 50 for a film capacitor between a pressing roll 31 and a cooling roll 33 to cool it and
    winding up the cooled film 50 for a film capacitor having a thickness of 10 μm or less on a winding equipment 40,
    wherein assuming that a shear rate of the molten molding material 1 in the lip part 21 of the T dice 20 is set to γ [/s] and that a circumferential speed of the cooling roll 33 is set to V [m/s], a ratio V/γ [m] of a circumferential speed V of the cooling roll 33 to a shear rate γ of the molding material 1 falls in a range of $3.0 \times 10^{-2}$ to $90 \times 10^{-2}$ [m].

4 Claims, 1 Drawing Sheet

METHOD FOR MANUFACTURING RESIN FILM FOR THIN FILM-CAPACITOR AND THE FILM THEREFOR

This Nonprovisional application claims priority under 35 U.S.C. §119 (a) on Patent Application No. 2009-259615 filed in Japan on 13 Nov. 2009, the entire contents of which are hereby incorporated by reference.

BACKGROUND OF THE INVENTION AND RELATED ART STATEMENT (1) Field of the Invention The present invention relates to a method for manufacturing a resin film for a thin film capacitor which is excellent in a heat resistance, a thickness accuracy, a voltage resistance and the like and a resin film for a thin film capacitor.

(2) Description of the Prior Art

A capacitor can be classified into three kinds of a thin film capacitor (or a resin capacitor), a ceramic capacitor and an aluminum electrolysis capacitor according to the kind of dielectric substances. Among three kinds of the above capacitors, the film capacitor has characteristics such as less characteristic change to temperature and a frequency, a high insulation property, a small dielectric loss and the like, and therefore it is considered to be more excellent than other capacitors (refer to a technical document 1).

A resin film for a film capacitor comprises a polypropylene resin (PP resin), a polystyrene resin (PS resin), a polyethylene terephthalate resin (PET resin), a polycarbonate resin (PC resin), a polyvinylidene fluoride resin (PVDF resin), a polyethylene tetrafluoride resin (PTFE resin), a polyimide resin (PI resin), a polyphenylene sulfide resin (PPS resin), a polyethylene naphthalate resin (PEN resin) and the like. It is formed as a dielectric layer for a film capacitor, and a metal deposition layer is formed as an electrode, whereby it is put into practical use.

At present, a film for a film capacitor is a film obtained from four kinds of a PP resin, a PET resin, a PPS resin or a PEN resin, and films comprising other resins have problems in a processing characteristic and a cost and therefore come to be scarcely used (refer to the technical document 1).

However, a film for a film capacitor comprising a PP resin or a PET resin has a problem on a heat resistance due to a use temperature of 105° C. or lower in the PP resin and a use temperature of 125° C. or lower in the PET resin. Accordingly, when it is applied to, for example, a film for a film capacitor in a hybrid car to which a heat resistance of 150° C. or higher is required, (1) a method in which a large-sized cooling device is installed neglecting request to a reduction in a weight or (2) a method in which a film for a film capacitor is installed at a driving seat side and the like far apart from an engine room of a heat source neglecting a space efficiency can not help being employed, and new problems in terms of a reduction in a weight and a cost are brought about.

A film for a film capacitor made of a PPS resin has a use temperature of 160° C. or lower and is provided with a good heat resistance, but it has a low dielectric breakdown voltage and is inferior in a voltage resistance, so that a use range thereof is limited. Further, a film for a film capacitor made of a PEN resin has a use temperature of 160° C. or lower and is provided with a good heat resistance, but it has a large dielectric loss and a large temperature dependability of a dielectric dissipation factor, so that a use range thereof is limited (refer to the technical document 1).

In light of the above limitations, a film made of a polyetherimide resin (PEI resin) attracts attentions as a film for a film capacitor (refer to the technical document 1 and a technical document 2). The above film for a film capacitor made of the polyetherimide resin has a glass transition point of 200° C. or higher and is excellent in a heat resistance and a voltage resistance, and it has a high dielectric breakdown voltage and a small frequency dependability and a small temperature dependability of a dielectric dissipation factor, so that it is most suitable for a film capacitor.

On the other hand, in recent years, a film for a film capacitor is requested to have a thickness of 10 µm or less because of a reduction in a size and a thickness of a film capacitor itself. In addition thereto, a high thickness accuracy thereof is required in order to meet requests of a stable voltage resistance and a uniformization in a winding form. In order to satisfy the above requests, almost all films for a film capacitor are produced by a melt extrusion molding biaxial stretching method.

The melt extrusion molding biaxial stretching method is suited to production of a film for a film capacitor having a thickness of 10 µm or less, but a vertical stretching machine and a lateral stretching machine (tenter method) or a simultaneous biaxial drawing machine has to be used and, therefore processing costs such an electric power cost and the like are likely to go up, and the yields of the raw materials are likely to be deteriorated.

In contrast with this, a non-stretching melt extrusion molding method in which stretching is not carried out after melt extrusion can be reduced in processing costs such an electric power cost and the like, and the high yields of the raw materials can be expected. On the other hand, the problem that a film for a film capacitor having a thickness of 10 µm or less can not be produced at a high thickness accuracy is involved therein.

CROSS-REFERENCE TO RELATED APPLICATIONS

Patent document 1: Japanese Patent Application Laid-Open No. 152590/2009
Patent document 2: Japanese Patent Application Laid-Open No. 300126/2007
Technical document 1: Y. Kano: "Technical Trend of Film for condenser" Convertec, No. 40, July issue, p. 82 to 88 (2006)

SUMMARY OF THE INVENTION

The present invention has been made in light of the problems described above, and an object thereof is to provide a method for manufacturing a film for a film capacitor making it possible to produce a film which has a thickness of 10 µm or less and which is excellent in a heat resistance and a voltage resistance at a high thickness accuracy by using a polyetherimide resin and to provide as well a film for a film capacitor.

In order to solve the problems described above, the present invention is characterized by a production method comprising the steps of feeding a molding material into an extruding equipment, extruding a film for a film capacitor downward from a lip part of a T dice tip thereof, interposing the above extruded film for a film capacitor between a pressing roll and a cooling roll to cool it and winding up the above cooled film for a film capacitor having a thickness of 10 µm or less on a winding equipment, wherein the molding material is at least a polyetherimide resin; and assuming that a shear rate of the molten molding material in the lip part of the T dice is set to $\gamma$ [/s] and that a circumferential speed of the cooling roll is set to V [m/s], a ratio V/$\gamma$ [m] of a circumferential speed V of the cooling roll to a shear rate γ of the molding material falls in a range of $3.0\times10^{-2}$ to $90\times10^{-2}$ [m].

The molding material can be prepared by blending 1 to 30 parts by mass of a fluorocarbon resin with 100 parts by mass of the polyetherimide resin.

Also, a filter having an aperture which is large by four times or less of a thickness of the film for a film capacitor can be allowed to be present between the extruding equipment and the T dice.

Further, a clearance of the lip part in the T dice can be set to 0.11 to 1.00 mm, and a temperature of the cooling roil can be allowed to fall in a range of a glass transition point of the polyetherimide resin −100° C. to +50° C.

Also, a circumferential surface roughness of the cooling roll falls preferably in a range of 1 to 10 μm in terms of a center line average height.

Further, fine irregularities are formed on a surface of the film for a film capacitor due to transfer of a circumferential surface roughness of the cooling roll, and a center line average height of the film falls preferably in a range of 0.01 to 0.50 μm.

In order to solve the problems described above, the present invention is characterized by producing the film for a film capacitor by the method for manufacturing a film for a film capacitor described above.

In this regard, the molding material falling in a range of the claims is prepared preferably by blending a polyetherimide resin with a fluorocarbon resin from the viewpoint of obtaining an excellent heat resistance. Various fillers such as silica and the like and a thermoplastic resin can suitably be added to them as long as specific troubles are brought about. A non-stretching melt extrusion T die molding method is employed in the present invention, and an extruding machine used in the above method may be either a single shaft type or a double shaft type. Also, the film for a film capacitor according to the present invention can be used at least for inverters and the like in hybrid cars, wind power generation and solar power generation.

In a thickness accuracy required to the film for a film capacitor, a standard deviation value determined from a measured value of a film thickness is an index. When a thickness of the film is 5 μm or less, a winding form of the film capacitor is uniformized if the standard deviation value is approximately 0.2 or less. Further, in a voltage resistance required to the film for a film capacitor, a minimum dielectric breakdown voltage is an index from the viewpoint of assuring the performances of the film capacitor.

In this regard, an effect of a thickness of the film for a film capacitor is exerted on the above minimum dielectric breakdown voltage, and therefore assuming that the minimum dielectric breakdown voltage is Emin, a minimum dielectric breakdown voltage per a unit thickness obtained by dividing this Emin by an average value tav of a thickness of the film for a film capacitor is an effective index. If the value of the above minimum dielectric breakdown voltage is 200 V/μm or more, the film for a film capacitor is suited to practical use and considered to be advantageous in terms of a reduction in a size of the film capacitor.

According to the present invention, the polyetherimide resin having a glass transition point of 200° C. or higher is used at least for the molding material, and therefore the heat resistance which can be endured even against a temperature of, for example, 150° C. or higher can be obtained. Further, since the polyetherimide resin is excellent in a thickness accuracy, a winding form of the film capacitor is uniformized, and the minimum dielectric breakdown voltage is stabilized. Also, a minimum dielectric breakdown voltage per a unit thickness in the film for a film capacitor exceeds 200 V/μm, and therefore the thin film for a film capacitor can sufficiently be provided with a voltage resistance.

Further, a ratio V/γ [m] of a circumferential speed V of the cooling roll to a shear rate γ of the molding material is controlled to a range of $3.0\times10^{-2}$ to $90\times10^{-2}$ [m], and therefore it is prevented that an amount of the molding material adhered to an edge of a lip part in the T dice grows large. And, it is prevented to produce stripes on a surface of the film for a film capacitor and to reduce a thickness accuracy of the film for a film capacitor due to the molding material adhered and solidified. Further, the molding material is less likely to be peeled off from an inner surface at an upper stream side than an edge of the lip part, and a thickness accuracy of the film for a film capacitor is less likely as well to be reduced.

According to the present invention, provided is the effect that the film for a film capacitor which is excellent in a heat resistance and a voltage resistance and which has a thickness of 10 μm or less can be produced at a high thickness accuracy by using the polyetherimide resin.

Also, if a clearance of the lip part in the T dice is set to 0.11 to 1.00 mm, capable of being removed is the risk that the clearance is clogged by foreign matters contained in the molding material or lumps of the molding material which are produced in the extruding machine and the T dice to produce stripes on the film for a film capacitor. Further, the situation that cooling unevenness is brought about on the film for a film capacitor in a cooling step can be prevented in advance.

If a temperature of the cooling roll is allowed to fall in a range of a glass transition point of the polyetherimide resin −100° C. to +50° C., the polyetherimide resin of the molding material can be prevented from being rapidly cooled to bring about shrinkage on the film for a film capacitor, and the film for a film capacitor can be prevented from not being evenly peeled off from the cooling roll to reduce a thickness accuracy. Further, the situation that the film for a film capacitor is molten and adhered on the cooling roll and broken can be prevented as well.

DESCRIPTION of THE PREFERRED EMBODIMENTS

Figure 1:
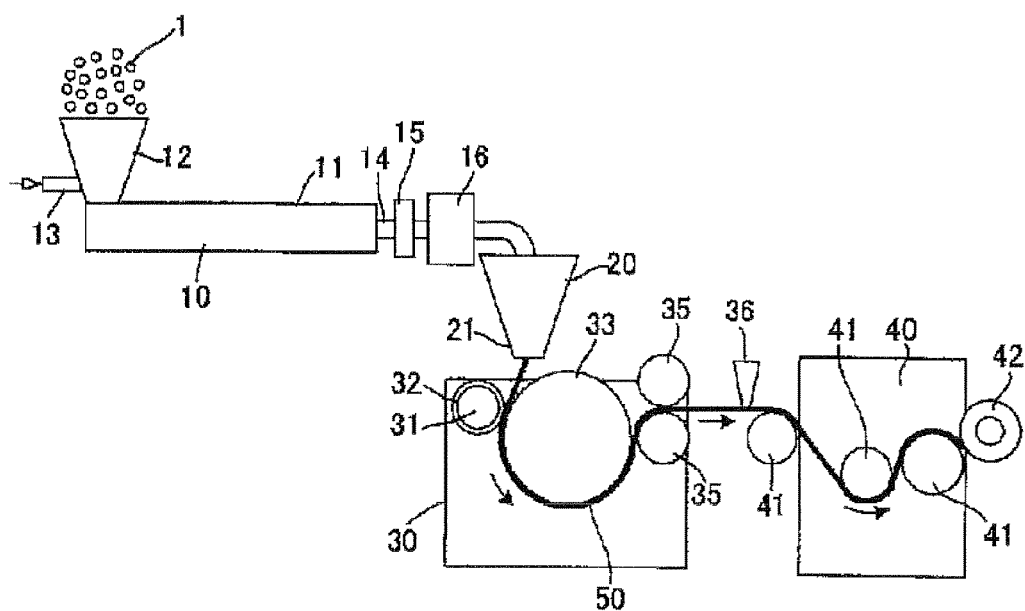
FIG. 1 is an overall explanatory drawing schematically showing the embodiments of the method for manufacturing a film for a film capacitor according to the present invention and the film for a film capacitor.
Figure 2:
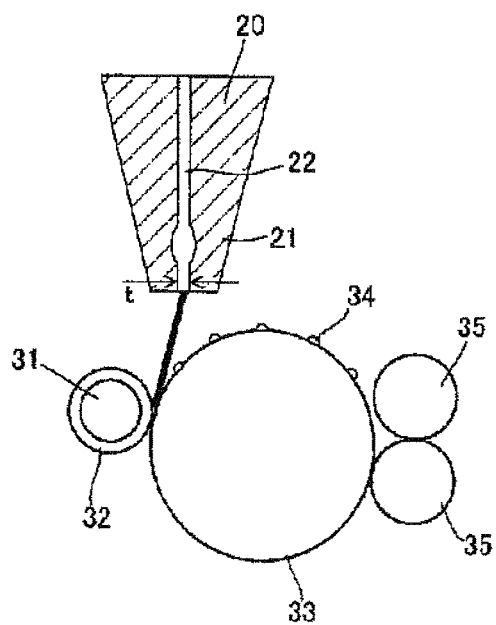
FIG. 2 is a partial cross-sectional explanatory drawing schematically showing a T dice and a receiving device in an embodiment of the method for manufacturing a film for a film capacitor according to the present invention and the film for a thin film capacitor.

The embodiments of the present invention shall be explained below with reference to the drawings. The method for manufacturing a film for a film capacitor in the embodiments of the present invention is a manufacturing method in which, as shown in FIG. 1 and FIG. 2, a molding material 1 is fed into extruding equipment 10, and a film 50 for a film capacitor is extruded immediately downward from a tapered lip part 21 of a T dice 20 tip and molded; the above extruded and molded film 50 for a film capacitor is interposed in a receiving device 30 and cooled while withdrawn rapidly and instantly; and the above cooled thin film 50 for a film capacitor having a thickness of 10 μm or less is wound on a winding device 40.

The molding material 1 comprises at least a polyetherimide resin, and an antioxidant, a light stabilizer, a UV absorber, a plasticizer, a lubricant, a flame retardant, an antistatic agent, a heat resistance improver, a filler and the like are added selectively as long as the characteristics of the present invention are not damaged. The polyetherimide resin shall not specifically be restricted and includes, for example, resins having repetitive units represented by the following chemical structural formulas (1) and (2):

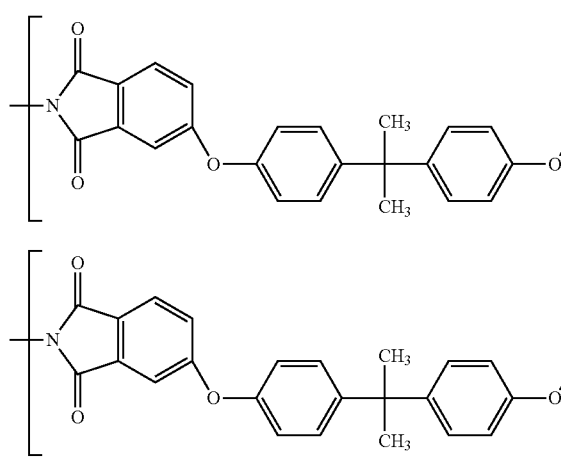

(1)

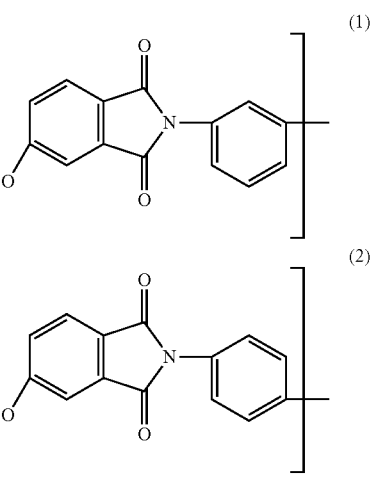

(2)

A method for manufacturing the polyetherimide resin includes, for example, manufacturing methods described in Japanese Patent Publication No. 9372/1982 and Japanese Patent Application Laid-Open (through PCT) No. 500867/1984. The specific polyetherimide resin includes, for example, Ultem 1000-1000 (trade name; glass transition point: 211° C., manufactured by SABIC Innovative Plastics Holding IP BV), Ultem 1010-1000 (trade name; glass transition point: 223° C., manufactured by SABIC Innovative Plastics Holding IP BV), Ultem CRS5001-1000 (trade name; glass transition point: 235° C., manufactured by SABIC Innovative Plastics Holding IP BV) and the like.

Block copolymers and random copolymers with other copolymerizable monomers and modified matters thereof can be used for the polyetherimide resin as long as the effects of the present invention are not damaged. For example, Ultem XH6050-1000 (trade name; glass transition point: 252° C., manufactured by SABIC Innovative Plastics Holding IP BV) which is a polyetherimide sulfone copolymer can be used. The polyetherimide resins may be used alone or in an alloy or a blend of two or more kinds thereof.

Publicly known thermoplastic resins including thermoplastic polyimide base resins such as polyimide resins (PI resins), polyamideimide resins (PAI resins) and the like, polyarylene ketone resins such as polyetherether ketone resins (PEEK resins), polyether ketone resins (PK resins) and the like, aromatic polyether sulfone resins such as polysulfone resins (PSU resins), polyether sulfone resins (PES resins), polyphenylene sulfone resins (PPSU resins) and the like, polyarylene sulfide resins such as polyphenylene sulfide resins (PPS resins), polyphenylene sulfide sulfone resins, polyphenylene sulfide ketone resins and the like, liquid crystal polymers (LCP) and the like are suitably added to the molding material 1 as long as the characteristics of the present invention are not damaged. Liquid crystal polymers of any types of a I type, a II type and a III type can be used.

The molding material 1 is mixed preferably with a fluorocarbon resin having a specific melt viscosity while stirring in order to provide the film 50 for a film capacitor with a sliding property, and the mixture is kneaded by means an extrusion kneading equipment, subjected to drying treatment and then put into the extruding equipment 10. The fluorocarbon resin is a compound having a fluorine atom on a principal chain of a molecular structure in which a melt viscosity measured on the conditions of a temperature of 360° C. and a load of 50 kgf by means of a flow tester using a dice having a diameter of 1.0 mm and a length of 10 mm is 120,000 poise or less.

A melt viscosity of the fluorocarbon resin is 120,000 poise or less because of the reasons that if it exceeds 120,000 poise, a fluidity of the fluorocarbon resin is notably reduced to generate fine projections on a surface of the film 50 for a film capacitor and that the film 50 for a film capacitor is reduced in a dielectric breakdown voltage to bring about a problem on a voltage resistance thereof. Further, because of a high melt viscosity and a very small fluidity, the fluorocarbon resin is gelated to produce holes on the film 50 for a film capacitor in gelated parts, or the film 50 for a film capacitor is reduced in a mechanical property due to inferior dispersion of the fluorocarbon resin to make the film 50 for a film capacitor liable to be broken during production thereof, and therefore it becomes difficult to produce the thin film 50 for a film capacitor.

Usually, the fluorocarbon resin is preferably solid at a temperature of lower than a melting point. The specific examples of the above fluorocarbon resin includes polytetrafluoroethylene (ethylene tetrafluoride resin, melting point: 325 to 330° C., continuous use temperature: 260° C., hereafter abbreviated as a PTFE resin), tetrafluoroethylene-perfluoroalkyl vinyl ether copolymers (ethylene tetrafluoride-perfluoroalkoxyethylene copolymer resin, melting point: 300 to 315° C., continuous use temperature: 260° C., hereafter abbreviated as a PFA resin), tetrafluoroethylene-hexafluoropropyl copolymers (ethylene tetrafluoride-propyl hexafluoride copolymer resin, melting point: 270° C., continuous use temperature: 200° C., hereafter abbreviated as an FEP resin), tetrafluoroethylene-ethylene copolymers (ethylene tetrafluoride-ethylene copolymer resin, melting point: 260 to 270° C., continuous use temperature: 150° C., hereafter abbreviated as an ETFE resin), polyvinylidene fluoride (vinylidene fluoride resin, melting point: 170 to 175° C., continuous use temperature: 150° C., hereafter abbreviated as a PVDF resin), polychlorotrifluoroethylene (ethylene trifluorochloride resin, melting point: 210 to 215° C., continuous use temperature: 120° C., hereafter abbreviated as a PCTFE resin) and the like.

Among the above fluorocarbon resins, the PFA resin and the FEP resin are preferably used from the viewpoints of a continuous use temperature of 200° C. or higher, an excellent heat resistance, handling and costs. The PFA resins and the FEP resins may be used alone or can be used in a blend.

When thermoplastic resin-molded matters and thermosetting resin-molded matters are provided with a sliding property, it is usually effective to add a PTFE resin having a minimum frictional coefficient among those of solid materials. The PTFE resin has a continuous use temperature of 260° C. and is excellent in a heat resistance, but it has a very high melt viscosity and therefore is scarcely observed to have a melt fluidity.

Accordingly, in a case where the PTFE resin is added to the polyetherimide resin to prepare a composition and where this composition is used to mold the film 50 for a film capacitor by extrusion, the PTFE resin is present in the form of fine particles in the film 50 for a film capacitor. Accordingly, fine projections are formed on the film 50 for a film capacitor as is the case with addition of inorganic additives, and the film 50 for a film capacitor is reduced in a dielectric breakdown voltage to bring about a problem on a voltage resistant characteristic. Further, because of a high melt viscosity and a very small fluidity, the fluorocarbon resin is gelated to produce holes on the film 50 for a film capacitor in gelated parts, or the film 50 for a film capacitor is reduced in a mechanical property due to inferior dispersion of the fluorocarbon resin to make the film 50 for a film capacitor liable to be broken during production thereof, and therefore it becomes very difficult to produce the thin film 50 for a film capacitor.

When the fluorocarbon resin is liquid, it bleeds out from the film 50 for a film capacitor after extruding and molding to bring about inferior deposition of a metal deposition layer, or the metal deposition layer is likely to be peeled off after deposition to contaminate an inside of the capacitor. Accordingly, it is not preferred to add the liquid fluorocarbon resin.

When the fluorocarbon resin is added to the polyetherimide resin of the molding material 1, 1.0 to 30.0 parts by mass of the fluorocarbon resin based on 100 parts by mass of the polyetherimide resin is preferably added. This is because when an amount of the fluorocarbon resin is less than 1.0 part by mass, the film 50 for a film capacitor can not sufficiently be provided with a sliding property.

In contrast with this, when an amount of the fluorocarbon resin exceeds 30.0 parts by mass, no change is observed in a sliding property-improving effect of the film 50 for a film capacitor, and a frequency dependability of the dielectric dissipation factor grows large, so that an aptitude of the film 50 for a film capacitor is reduced. Further, a tensile strength of the film 50 for a film capacitor is reduced, and the film 50 for a film capacitor is liable to be broken during production thereof, so that an adverse effect is likely to be exerted on production of the thin film 50 for a film capacitor and deposition of the metal deposition layer.

A moisture content of the polyetherimide resin of the molding material 1 or a composition of the polyetherimide resin and other resins is controlled to 5000 ppm or less, preferably 2000 ppm or less before extruding and molding by means of a hot air dryer. This is because of the reason that if a moisture content of the molding material 1 exceeds 5000 ppm, the film 50 for a film capacitor is likely to be foamed.

In the extruding equipment 10, a screw equipped with spiral grooves is rotatably mounted, as shown in FIG. 1, in a horizontally long cylinder 11 to be heated, and the above screw is rotated by driving of a driving device to melt and knead the molding material 1 added and functions so that the molding material 1 is supplied to a T dice 20 at a tip part side. A hopper 12 for supplying the molding material 1 is installed at an upper side of an end part in the cylinder 11 so that it is communicated therewith, and an inert gas-supplying tube 13 for continuously supplying an inert gas such as a helium gas, a neon gas, an argon gas, a krypton gas, a nitrogen gas, a carbon dioxide gas and the like is connected with a lower part of the hopper 12 communicated at least with the cylinder 11 from the viewpoint of preventing oxidation and deterioration of the molding material 1.

A connecting tube 14 to be heated is connected with an opened tip part of the cylinder 11, and a filter 15 for filtration is mounted to the above connecting tube 14. A gear pump 16 for extruding the molding material 1 at a constant speed is installed in a downstream position of the above filter 15.

The filter 15 comprises, for example, a disc provided concentrically with a lot of pores, sintered metal having many pores, a metal-made mesh or the like and has plural apertures which are four times or less, preferably three times or less and more preferably 2.9 to 3.8 times or less as large as a thickness of the film 50 for a film capacitor, and it is mounted between the extruding equipment 10 and the gear pump 16. A disc, a mesh or the like in the above filter 15 is used, if necessary, in a plural number. The above filter 15 highly disperses the molding material 1 flowing through the connecting tube 14, removes foreign matters, gelated matters and the like contained in the molten molding material 1 and elevates a back pressure in the cylinder 11 to increase a kneading effect of the molding material 1.

A temperature of the extruding equipment 10 is controlled preferably to a glass transition point of the molding material 1 in a tip part of the cylinder 11 +50° C. to +200° C., and it is set to a range of approximately 300 to 400° C.

The T dice 20 is connected with a tip part bent to a lower side of the connecting tube 14 and has the functions of spreading the molding material 1 supplied from the gear pump 16 of the extruding equipment 10 to a width direction and extruding continuously the above molding material 1 from an elongated clearance 22 of the lip part 21 to mold the film 50 for a film capacitor. A temperature of the above T dice 20 is controlled so that it is equivalent preferably to a melting temperature of the molding material 1 in flowing into the T dice 20.

In a receiving equipment 30, a rotatable press roll 31 having a reduced diameter and a metal-made cooling roll 33 having an expanded diameter which interpose therebetween the film 50 for a film capacitor extruded from the T dice to a lower side while pressing are oppositely disposed, and a pair of upper and lower carrying rolls 35 for controlling curling while interposing and cooling the film 50 for a film capacitor are rotatably disposed in a downstream of the above cooling roll 33. A thickness-measuring device 36 for measuring a thickness of the film 50 for a film capacitor is provided in a downstream of a pair of the above upper and lower carrying rolls 35.

An elastic adhesion layer or an elastic contact layer 32 for enhancing an adhesive property of the film 50 for a film capacitor with the cooling roll 33 is adhered on a circumferential surface of the press roll 31. The above adhesion layer 32 is formed by natural rubber, isoprene rubber, butadiene rubber, norbornene rubber, acrylonitrile butadiene rubber, nitrile rubber, urethane rubber, silicone rubber or fluorocarbon rubber, and the silicone rubber and the fluorocarbon rubber are most suited from the viewpoint of a heat resistance. An inorganic compound comprising silica, alumina and the like is suitably added to the above materials of the adhesion layer 32.

A circumferential surface of the cooling roll 33 is formed in a prescribed roughness, and fine irregularities 34 are selectively formed on the circumferential surface. The cooling roll is used in a temperature range of a glass transition point of the polyetherimide resin −100° C. to +50° C. A circumferential surface roughness of the cooling roll 33 is suitably 0.02 to 10 μm, preferably 0.03 to 7 μm and more preferably 0.03 to 5 μm in terms of a center line average height.

This is because when a center line average height in a circumferential surface form of the cooling roll 33 is less than 0.02 μm, it is difficult to form the fine irregularities 34 on a surface of the film 50 for a film capacitor. In contrast with this, when a center line average height exceeds 10 μm, the film 50 for a film capacitor is fused on the cooling roll 33 and broken.

The irregularities 34 are selectively formed on a circumferential surface of the cooling roll 33 in order to prevent blocking of the film 50 for a film capacitor in preparing the capacitor. To be specific, the fine irregularities 34 are formed in advance on a circumferential surface of the cooling roll 33, and the irregularities 34 are transferred onto a surface of the film 50 for a film capacitor when the film 50 for a film capacitor is pressed to the cooling roll 33 by the pressing roll 31, whereby blocking of the film 50 for a film capacitor can be prevented.

When the fine irregularities 34 are transferred onto a surface of the film 50 for a film capacitor, the fine irregularities 34 on a surface of the film 50 for a film capacitor are 0.01 to 0.50 μm, preferably 0.02 to 0.40 μm and more preferably 0.03 to 0.35 μm in terms of a center line average height. This is because when the fine irregularities 34 on a surface of the film 50 for a film capacitor are less than 0.01 μm, a deposition property of the film 50 for a film capacitor is likely to be reduced in an aluminum deposition step or the film 50 for a film capacitor is likely to be reduced in a sliding property.

A temperature of the cooling roll 33 falls in a range of a glass transition point of the polyetherimide resin −100° C. to +50° C. because of the reasons that when it is lower than −100° C., the polyetherimide resin is rapidly cooled down to generate shrink on the film 50 for a film capacitor and that the film 50 for a film capacitor is unevenly peeled off from a circumferential surface of the cooling roll 33 to reduce a thickness accuracy thereof. Contrary to the above, when the temperature exceeds 50° C., the film 50 for a film capacitor is fused on a circumferential surface of the cooling roll 33 and broken.

Plural rolls 41 for delivering the film 50 for a film capacitor supplied from the receiving equipment 30 are rotatably disposed at prescribed intervals in a winding equipment 40, and a winding tube 42 for winding in order the film 50 for a film capacitor is rotatably disposed in a downstream side of the above plural rolls 41. Slit knife edges for cutting both side parts of the film 50 for a film capacitor wound up on the winding tube 42 are suitably provided in the above winding equipment 40.

On the other hand, in respect to the cooling roll 33 and a shear rate of the molding material 1, assuming that a shear rate of the molten molding material 1 in the lip part 21 of the T dice 20 is set to γ [/s] and that a circumferential speed of the cooling roll 33 is set to V [m/s], a ratio V/γ [m] of a circumferential speed V of the cooling roll 33 to a shear rate γ of the molding material 1 falls in a range of $3.0 \times 10^{-2}$ to $90 \times 10^{-2}$ [m], preferably $4.0 \times 10^{-2}$ to $85 \times 10^{-2}$ [m] and more preferably $5.0 \times 10^{-2}$ to $80 \times 10^{-2}$ [m] from the viewpoint of producing the film 50 for a film capacitor having a thickness of 10 μm or less at a high thickness accuracy.

This is because when V/γ [m] is less than $3.0 \times 10^{-2}$ [m], a clearance 22 of the lip part 21 is narrow to accelerate the shear rate, so that swelling of the molding material 1 grows large by a Barus effect of the lip part 21. Further, a circumferential speed of the cooling roll 33 is relatively slow, and therefore an amount of the molding material 1 adhered to an edge of the lip part 21 is increased, so that stripes are produced on a surface of the film 50 for a film capacitor by the adhered and solidified molding material 1 to reduce a thickness accuracy. In addition thereto, wrinkles are generated in winding the film 50 for a film capacitor.

In contrast with this, when V/γ [m] exceeds $90 \times 10^{-2}$ [m], a shear rate of the molding material 1 is relatively slow, and a circumferential speed of the cooling roll 33 is relatively fast, so that the molding material 1 is peeled off from an inside flow surface at an upper stream side than an edge of the lip part 21 by rapid drawing of the molding material 1 to reduce a thickness accuracy of the film 50 for a film capacitor.

A shear rate γ [/s] of the molten molding material 1 in the lip part 21 of the T dice 20 is determined, as shown in FIG. 2, from an extrusion amount (kg/h) of the molding material 1, a flow amount Q (cm³/s) calculated from a density (g/cm³) of the molding material 1, a die face length W (mm) of the T dice 20 and t (mm) of the clearance 22 in the lip part 21 of the T dice 20 according to:

$$\gamma = (6Q)/(Wt^2)$$

The term t (mm) of the clearance 22 in the lip part 21 can not actually be measured in an operating state of the extruding equipment 10, and therefore it is measured in assembling the T dice 20 or before starting extrusion molding by means of a clearance gauge and a microscope.

In order to produce the film 50 for a film capacitor having a thickness of 10 μm or less at a high thickness accuracy, t of the clearance 22 in the lip part 21 falls in a range of 0.11 to 1.00 mm, preferably 0.12 to 0.80 mm and more preferably 0.14 to 0.50 mm. This is because of the reason that when t of the clearance 22 in the lip part 21 is less than 0.10 mm, foreign matters contained in the molding material 1 or lumps of the molding material 1 which are produced in the extruding equipment 10 and the T dice 20 clog the clearance 22 to generate stripes on the film 50 for a film capacitor.

In contrast with this, when t of the clearance 22 in the lip part 21 exceeds 1.00 mm, the molding material 1 extruded grows thicker and is increased in a heat capacity, and therefore uneven cooling in the cooling step in the receiving equipment 30 is brought about.

The film 50 for a film capacitor is molded in a thickness of 0.5 to 10.0 μm, preferably 1.0 to 7.0 μm and more preferably 1.5 to 5.0 μm. This is because when a thickness of the film 50 for a film capacitor is less than 0.5 μm, a tensile strength of the film 50 for a film capacitor is notably reduced to make it difficult to produce the film 50 for a film capacitor. In contrast with this, when a thickness of the film 50 for a film capacitor exceeds 10.0 μm, the capacitance per volume is reduced.

When producing the film 50 for a film capacitor in the case described above, the polyetherimide resin and the fluorocarbon resin which are weighed are stirred and mixed to prepare a mixture, and this mixture is kneaded by means of an extrusion kneading machine to prepare a resin composition having a pellet form. The above resin composition is subjected to drying treatment to reduce a moisture content, whereby the molding material 1 is prepared.

The molding material 1 thus prepared is put into the hopper 12 of the extruding equipment 10 shown in FIG. 1 while supplying an inert gas and continuously extruded from the heated T dice 20 to mold the film 50 for a film capacitor, and this film 50 for a film capacitor is interposed between the press roll 31 and the cooling roll 33 in the receiving equipment 30 and cooled and solidified while drawing rapidly and instantly, whereby a thickness thereof is controlled to 10 μm or less, preferably 1 to 7. The above film 50 for a film capacitor is wound in order on the receiving tube 42 positioned in a downstream side, whereby the film 50 for a film capacitor can be produced.

In the above case, an aperture of the filter 15 is set in advance to a size of 4 times or less as large as a thickness of the film 50 for a film capacitor, and foreign matters can be removed more effectively than ever. Accordingly, the fluorocarbon resin which provides the film 50 for a film capacitor with a sliding property is suitably dispersed in the molding material 1, and the productivity is enhanced. Further, the film 50 for a film capacitor which is wound is set later in a deposition equipment which is not illustrated, and patterns are formed in a stripe form on the metal deposition layer via a slit part.

According to the foregoing, a ratio $V/\gamma$ [m] of a circumferential speed V of the cooling roll 33 to a shear rate $\gamma$ of the molding material 1 is set in advance to a range of $3.0 \times 10^{-2}$ to $90 \times 10^{-2}$ [m], and stretching is carried out slowly, so that the film 50 for a film capacitor having a thickness of 10 μm or less can be produced at a high thickness accuracy. Further, processing costs such as an electric power cost and the like can be reduced, and a high yield of the raw material can be expected very much.

The polyetherimide resin having a glass transition point of 200° C. or higher or a mixture of the polyetherimide resin and the fluorocarbon resin having a continuous use temperature of 200° C. or higher is used as the molding material 1 for the film 50 for a film capacitor, and therefore the heat resistance which can endure an environment of 150° C. or higher can be obtained. Also, since the film 50 for a film capacitor is excellent as well in a thickness accuracy, a winding form of the film capacitor is uniformized, and a stability of the dielectric breakdown voltage can be obtained as well. Further, a minimum dielectric breakdown voltage per unit thickness in the film 50 for a film capacitor exceeds 200 V/μm, and the film 50 for a film capacitor can be provided with an excellent voltage resistance.

In the embodiment described above, an inert gas-supplying tube 13 is connected with a lower part of the delivering hopper 12 communicating with the cylinder 11, and the inert gas-supplying tubes 13 may be connected respectively with upper and lower parts of the delivering hopper 12 to prevent surely generation of die lines, oxidation and the like. Also, the single filter 15 is connected with the connecting tube 14 in the extruding equipment 10, and the plural filters 15 may be connected.

EXAMPLES

Next, the examples of the present invention shall be explained together with comparative examples.

Example 1

First, a tumbler mixer was charged with 10 kg of a polyetherimide resin (trade name: Ultem 1010-1000, manufactured by SABIC Innovative Plastics Holding IP BV) 100 parts by mass and 0.5 kg of a PFA resin (trade name: Fluon PFA P-62XP, manufactured by Asahi Glass Co., Ltd.) 5 parts by mass, and they were stirred and mixed for 30 minutes. A melt viscosity of the PFA resin at 360° C. was 11,100 poise.

After the polyetherimide resin was mixed with the PFA resin to prepare a mixture, this mixture was molten and kneaded by means of a high speed double shaft extrusion molding machine of Φ30 mm (trade name: PCM30 L/D=35, manufactured by IKEGAI Corporation) equipped with a vacuum pump, and the kneaded matter was extruded from a dice in a rod form and cut after cooled with water to prepare a pellet-shaped resin composition having a size of a length of 4 to 6 mm and a diameter of 2 to 4 mm. In the above case, the mixture was kneaded under reduced pressure on the conditions of a cylinder temperature of 320 to 350° C., an adapter temperature of 360° C. and a dice temperature of 360° C. in the high speed double shaft extrusion molding machine.

After the resin composition was prepared, the above resin composition was left standing still for 24 hours in a hot air dryer equipped with an exhaust port which was heated at 160° C. and subjected to drying treatment, and after confirming that a moisture content of the resin composition was 250 ppm or less, it was set as a molding material. A density of the resin composition was 1.27 g/cm$^3$.

Next, the molding material was put in a delivering hopper of a single shaft extruding equipment of Φ40 mm and molten and kneaded by means of a full light screw having a compression ratio of 2.5, and it was continuously extruded from a T dice having a width of 400 mm in which a clearance of a lip part was controlled to 0.30 mm on the conditions of a dice temperature of 350 to 360° C. and an extrusion amount of 7 kg/hour to mold a film for a film capacitor. The film for a film capacitor was interposed between a pressing roll and a cooling roll controlled to a circumferential speed of 60 m/minute in a receiving equipment so that a ratio $V/\gamma$ [m] of a circumferential speed V of the cooling roll to a shear rate $\gamma$ of the molding material fell in a range of $3.0 \times 10^{-2}$ to $90 \times 10^{-2}$ [m], and it was cooled and solidified.

MVS40-25 L/D=25 (trade name, manufactured by IKG Corporation) was used for the single shaft extruding equipment to extrude the molding material on the conditions of a cylinder temperature of 320 to 350° C., a screw revolution of 30 rpm and a connecting tube temperature of 360° C.

After cooling and solidifying the film for a film capacitor, both side parts of the above film for a film capacitor were cut by means of a slit knife edge in a winding equipment and wound up in order on a winding tube of the winding equipment to produce the film for a film capacitor having a thickness of 5 μm, a length of 1000 m and a width of 250 mm in a band form. After the film for a film capacitor was produced in the manner described above, an appearance thereof was carefully observed, and a thickness and a dielectric breakdown voltage thereof were measured respectably. The results thereof are summarized in Table 1.

Example 2

The present example was fundamentally the same as Example 1, and a film for a film capacitor was molded by continuously extruding the molding material from the T dice having a width of 400 mm in which a clearance of a lip part was controlled to 0.15 mm so that a ratio $V/\gamma$ [m] of a circumferential speed V of the cooling roll to a shear rate $\gamma$ of the molding material fell in a range of $3.0 \times 10^{-2}$ to $90 \times 10^{-2}$ [m] to produce the film for a film capacitor having a thickness of 5 μm, a length of 1000 m and a width of 250 mm. After the film for a film capacitor was produced, an appearance thereof was carefully observed, and a thickness and a dielectric breakdown voltage thereof were measured respectably. The results thereof are summarized in Table 1.

Example 3

The present example was fundamentally the same as Example 1, and a film for a film capacitor was molded by continuously extruding the molding material from the T dice having a width of 400 mm in which a clearance of a lip part was controlled to 0.15 mm so that a ratio V/γ [m] of a circumferential speed V of the cooling roll to a shear rate γ of the molding material fell in a range of $3.0 \times 10^{-2}$ to $90 \times 10^{-2}$ [m]. The film for a film capacitor thus extruded and molded was interposed between the pressing roll and the cooling roll controlled to a circumferential speed of 100 m/minute in the receiving equipment, and it was cooled and solidified to produce the film for a film capacitor having a thickness of 3 μm, a length of 1000 m and a width of 250 mm.

After the film for a film capacitor was produced, an appearance thereof was carefully observed, and a thickness and a dielectric breakdown voltage thereof were measured respectably. The results thereof are summarized in Table 1.

Comparative Example 1

The present comparative example was fundamentally the same as Example 1, and a film for a film capacitor was molded by continuously extruding the molding material from the T dice having a width of 400 mm in which a clearance of a lip part was controlled to 2.00 mm so that a ratio V/γ [m] of a circumferential speed V of the cooling roll to a shear rate γ of the molding material fell outside a range of $3.0 \times 10^{-2}$ to $90 \times 10^{2}$ [m] to produce the film for a film capacitor having a thickness of 5 μm, a length of 1000 m and a width of 250 mm. After the film for a film capacitor was produced, an appearance thereof was carefully observed, and a thickness and a dielectric breakdown voltage thereof were measured respectably. The results thereof are summarized in Table 1.

Comparative Example 2

The present comparative example was fundamentally the same as Example 1, and a film for a film capacitor was molded by continuously extruding the molding material from the T dice having a width of 400 mm in which a clearance of a lip part was controlled to 0.60 mm so that a ratio V/γ [m] of a circumferential speed V of the cooling roll to a shear rate γ of the molding material fell outside a range of $3.0 \times 10^{-2}$ to $90 \times 10^{-2}$ [m] to produce the film for a film capacitor having a thickness of 5 μm, a length of 1000 m and a width of 250 mm. After the film for a film capacitor was produced, an appearance thereof was carefully observed, and a thickness and a dielectric breakdown voltage thereof were measured respectably. The results thereof are summarized in Table 1.

Comparative Example 3

The present comparative example was fundamentally the same as Example 1, and a film for a film capacitor was tried to be molded by continuously extruding the molding material from the T dice having a width of 400 mm in which a clearance of a lip part was controlled to 0.10 mm so that a ratio V/γ [m] of a circumferential speed V of the cooling roll to a shear rate γ of the molding material fell outside a range of $3.0 \times 10^{-2}$ to $90 \times 10^{-2}$ [m], but stripes and wrinkles were produced, and the film for a film capacitor could not be produced.

Melt Viscosity:

The melt viscosity was measured by means of a flow tester (trade name: Shimadzu Flow Tester CFT-500 type A, manufactured by Shimadzu Corporation). In measuring the above melt viscosity, 1.5 cm³ of the resin was filled in a cylinder of 360° C. equipped with a die having a diameter of 1 mm and a length of 10 mm, and a plunger having an area of 1 cm² was mounted on an upper part of the above cylinder. When a temperature of the cylinder reached 360° C., it was pre-heated for 5 minutes, and immediately thereafter, a load of 50 kgf was applied to allow the molten fluorocarbon resin to flow out, whereby the melt viscosity was measured.

Appearance of the Film for a Film Capacitor:

An appearance of the film for a film capacitor was visually observed and evaluated by marking no generation of stripes with ◯ and generation of stripes with X, and the results thereof are summarized in Table 1.

Thickness of the Film for a Film Capacitor:

A thickness of the film for a film capacitor was determined by an average thickness obtained by measuring total 95 points of 19 points in a width direction of the film for a film capacitor and 5 points in a length direction thereof by means of a thickness meter of a contact type (trade name: Electron Micrometer Mirrotron 1240, manufactured by Mahr GmbH).

Dielectric Breakdown Voltage of the Film for a Film Capacitor:

A dielectric breakdown voltage of the film for a film capacitor was measured under an environment of 23° C. by a short-time dielectric breakdown test based on an aerial method according to JIS C 2110-1994. An electrode used for the measurement had a cylindrical form in which an upper form had a diameter 25 mm and a height 25 mm and in which a lower form had a diameter 25 mm and a height 15 mm.

TABLE 1

| | Clearance in lip part (μm) | Shear rate γ (/sec) | Circumferential speed of cooling roll (m/sec) | V/γ (m) | Film appearance | Film thickness (μm) | | | | Minimum dielectric breakdown voltage | |
|---|---|---|---|---|---|---|---|---|---|---|---|
| | | | | | | Average value $t_{av}$ | Maximum value | Minimum value | Standard deviation | $E_{min}$ (V) | $E_{min}/t_{av}$ (V/μm) |
| Example 1 | 0.30 | 255.2 | 60 | $23.5 \times 10^{-2}$ | ◯ | 4.82 | 5.24 | 4.31 | 0.205 | 1,080 | 224 |
| Example 2 | 0.15 | 1,020.7 | 60 | $5.9 \times 10^{-2}$ | ◯ | 4.71 | 5.10 | 4.24 | 0.186 | 1,050 | 223 |
| Example 3 | 0.15 | 1,020.7 | 100 | $9.8 \times 10^{-2}$ | ◯ | 2.90 | 3.33 | 2.60 | 0.152 | 640 | 221 |
| Comparative Example 1 | 2.00 | 5.7 | 60 | $1045.3 \times 10^{-2}$ | ◯ | 4.33 | 5.89 | 3.14 | 0.604 | 820 | 189 |
| Comparative Example 2 | 0.60 | 63.8 | 60 | $94.0 \times 10^{-2}$ | ◯ | 4.51 | 5.32 | 3.66 | 0.409 | 840 | 186 |
| Comparative Example 3 | 0.10 | 2,296.6 | 60 | $2.6 \times 10^{-2}$ | x | The sample could not be prepared due to generation of stripes and wrinkles | | | | | |

In the cases of the films for a film capacitor prepared in the examples, it has been found that they have a small standard deviation of a thickness and are excellent in a thickness accuracy. Further, it has been found as well that the minimum dielectric breakdown voltage per a unit thickness exceeds 200 V/μm and that the voltage resistance is excellent. Thus, it has been able to be proved that according to the present examples, the films for a film capacitor which are excellent in a thickness accuracy, a voltage resistance and the like can be produced.

In contrast with this, in the cases of the films for a film capacitor prepared in the comparative examples, a standard deviation of the thickness is large, and the thickness accuracy is inferior, so that the thicknesses have been scattered. Further, the minimum dielectric breakdown voltage per a unit thickness does not reach 200 V/μm, and a problem has been brought about on the voltage resistance.

What is claimed is:

1. A method for manufacturing a film for a film capacitor, comprising the steps of:

feeding a molding material into an extruding equipment, extruding a film for a film capacitor downward from a lip part of a T die tip thereof, interposing the above extruded film for a film capacitor between a pressing roll and a cooling roll to cool it, and winding up the above cooled film for a film capacitor having a thickness of 10 μm or less on a winding equipment, wherein the molding material comprises a polyetherimide resin that is mixed with a fluorocarbon resin, wherein a ratio V/y of the circumferential speed V [m/s] of the cooling roll to the shear rate y [/s] of the molten molding material in the lip part of the T die is $3.0 \times 10^{-2}$ to $90 \times 10^{-2}$ [m] and wherein the method excludes biaxial stretching.

2. The method for manufacturing a film for a film capacitor as described in claim 1, wherein a clearance of the lip part in the T die is set to 0.11 to 1.00 mm, and a temperature of the cooling roll falls in a range of a glass transition point of the polyetherimide resin −100° C. to +50° C.

3. A film for a film capacitor produced by the method for manufacturing a film for a film capacitor as described in claim 1 or 2.

4. The method for manufacturing a film for a film capacitor as described in claim 1, wherein a melt viscosity of the fluorocarbon resin is 120,000 poise or less.

* * * * *